May 31, 1960    R. O. BOCK ET AL    2,939,091
MODULATOR OR DEMODULATOR USING MAGNETORESISTIVE ELEMENTS
Filed Oct. 20, 1953

INVENTORS.
ROBERT O. BOCK
SIDNEY DAVIS

BY Raymond A. Paquin
ATTORNEY.

United States Patent Office

2,939,091
Patented May 31, 1960

2,939,091

MODULATOR OR DEMODULATOR USING MAGNETORESISTIVE ELEMENTS

Robert O. Bock, Garden City, and Sidney Davis, Brooklyn, N.Y., assignors to American Bosch Arma Corporation, a corporation of New York Filed Oct. 20, 1953, Ser. No. 387,256

5 Claims. (Cl. 332—51)

The present invention relates to modulators of electrical signals and has particular reference to devices which use elements whose electrical characteristics vary in the presence of a varying magnetic field.

In a preferred embodiment of the present invention the magnetically sensitive element is bismuth. Resistors made of or containing bismuth are known to have a resistivity which is dependent on the strength of the magnetic field in which they are located. A pair of such resistors are connected in series across the modulating signal power supply, and the resistors are located in a magnetic field whose amplitude varies according to the carrier frequency. The voltage output taken across one of the resistors is a voltage of carrier frequency which is amplitude modulated in accordance with the input signal voltage.

Alternatively, the bismuth resistors may form two arms of a normally balanced bridge with the signal voltage applied across one diagonal of the bridge and the output being taken across the other diagonal of the bridge.

In a modification of the basic circuit an auxiliary pair of bismuth resistors are placed in the magnetic field of the main pair and are supplied from a constant power supply. The output of the auxiliary circuit is degeneratively fed back to the carrier power supply to stabilize the magnetic field.

For a more complete understanding of the invention, reference may be had to the accompanying diagrams in which Fig. 1 is a schematic diagram of the basic series circuit;

Figure 1:
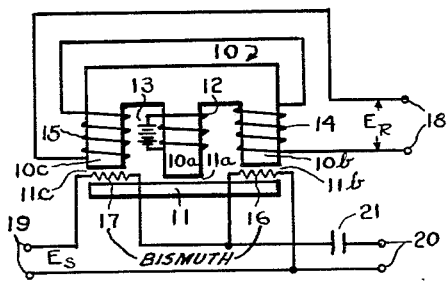
Figure 3:
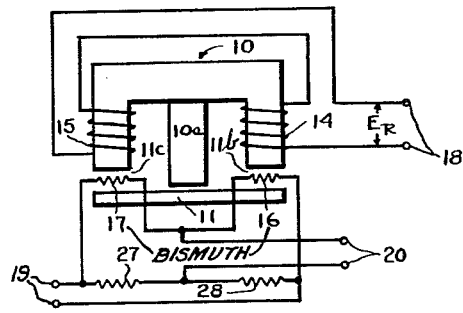
Fig. 3 is a schematic diagram of the basic bridge circuit.
Figure 2:
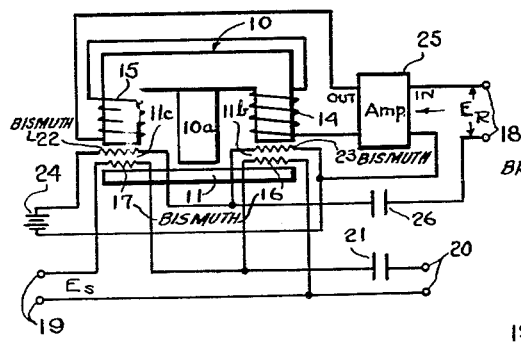
Fig. 2 is a schematic diagram of a modified series circuit.
Figure 4:
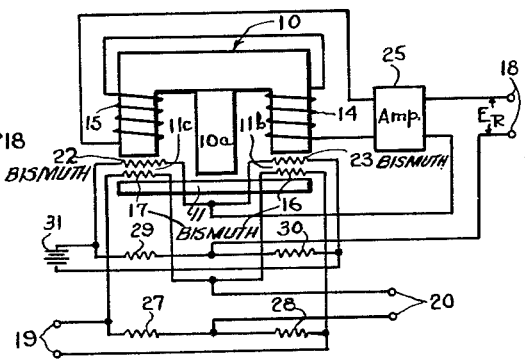
Fig. 4 is a schematic diagram of a modified bridge circuit.

Referring now to Figures 1 through 4, numeral 10 designates a three legged core having center leg 10a and outer legs 10b and 10c made of ferromagnetic material. A ferromagnetic yoke 11 is situated opposite the ends of each of the legs to complete the path of magnetic flux between the legs of the core. The center leg 10a constitutes a constantly magnetized member, and may be the armature of a solenoid 12 which is energized from the direct current source 13 as shown in Figure 1, or may be a permanent magnet as shown in Figures 2, 3 and 4. The path of the magnetic flux provided by the central leg 10a is from the leg 10a, through the air gap 11a, yoke 11, air gaps 11b and 11c to outer legs 10b and 10c respectively, through the legs 10b and 10c and the body of the core 10 back to the center leg 10a.

Solenoids 14 and 15 are wound on the outer legs 10b and 10c respectively and are electrically connected in series so as to provide magnetic flux of opposing direction in the outer legs 10b and 10c and in the air gaps 11b and 11c.

Figure 5:
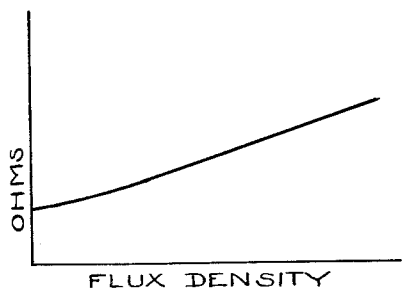
Fig. 5 shows the relationship between the resistance of bismuth and magnetic field.

Situated in each of the air gaps 11b and 11c are the resistors 16 and 17 respectively which are made of or contain the metallic element bismuth. It is a well known property of bismuth that its electrical resistance varies with the magnetic field in which it lies. Figure 5 shows the general relationship between the resistance and the flux density for a range of about zero to 40,000 gauss at room temperature.

It will be seen that the magnetic field in each of the air gaps 11b and 11c is composed of the field due to the magnetized center leg 10a and the field due to the solenoids 14 and 15. Since the field due to the center leg 10a is in the same direction in both air gaps 11b and 11c and the fields due to the solenoids 14 and 15 are in opposite directions, one air gap, 11b for example, will have a stronger magnetic field than the other air gap 11c. The center leg 10a therefore provides a "bias" field, while the solenoids 14, 15 cause the total field to vary about this "bias" value.

The resistance of the bismuth resistors 16, 17 which lie in the air gaps 11b and 11c therefore vary with the field produced by the solenoids 14, 15 and consequently vary according to the reference, Er, energizing the solenoids; in Figure 1, the voltage at terminals 18.

If the resistors 16, 17 are connected in series a circuit having constant resistance is obtained since the increase in the value of one resistor is accompanied by a corresponding decrease in the value of the other resistor as the voltage at terminals 18 changes. A signal voltage Es, at terminals 19, is applied to the series connected resistors 16, 17 and the voltage Es divides across the resistors 16, 17 according to the value of their resistance. It is evident then that if the signal voltage Es is a unidirectional voltage and the reference voltage Er is an alternating voltage the voltage across each of the resistors 16, 17 has a unidirectional component and an alternating component of the same frequency as the reference voltage. The alternating component across resistor 16, for example, is proportional in magnitude to the magnitude of the signal voltage Es and may be obtained at output terminals 20 by using the condenser 21 to block out the unidirectional component. In this manner a simple modulator for the direct current signal at terminal 19 is obtained.

Figure 2 shows a modification of the circuit in Figure 1 whereby the magnetic fields in the air gaps 11b and 11c are stabilized by feedback means. A pair of bismuth resistors 23 and 22, also situated in the air gaps 11b and 11c, are connected in series across a constant voltage supply provided by battery 24. The voltage across resistor 23 is applied to the input to amplifier 25 in series with the reference voltage Er at terminals 18, and the output of the amplifiers 25 is connected to energize the solenoids 14, 15. Condenser 26 is employed to block out the direct current component of the voltage across resistor 23.

Figure 3 shows an alternative arrangement using a bridge circuit to obtain the modulated output. The signal voltage at terminals 19 is applied across one diagonal of the bridge in which the arms are resistors 16, 17 and a pair of equal, constant value resistors 27 and 28. The output voltage taken between the junction of the bismuth resistors 16, 17 and the junction of the resistors 27 and 28 will be a voltage proportional in magnitude to the magnitude of signal voltage and alternating at the frequency of the reference voltage, Er.

Figure 4 is a modification of Figure 3 to include the flux standardization by means of a feedback loop. A separate bridge circuit, comprising bismuth resistors 23 and 22 in the air gaps 11b and 11c, constant equal valued resistors 29 and 30 is supplied by a constant voltage by battery 31. An alternating voltage is produced across the diagonal of the bridge between the bismuth resistors 22, 23 and the constant resistors 29 and 30 which is fed back with the reference voltage to the input of amplifier 25. The modulated output of the signal at terminals 19 is then available at terminals 20.

Figure 6:
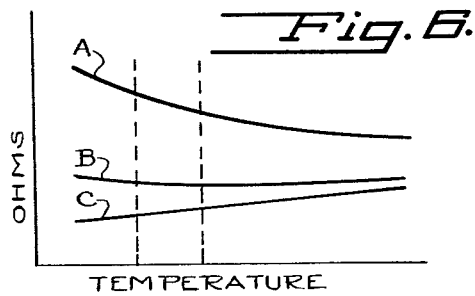
Fig. 6 shows the variation of resistance of bismuth with temperature for three values of magnetic field.

It has been determined that the resistivity of bismuth in a constant magnetic field varies with temperature as illustrated in Figure 6. Curve A is for a high flux density, curve B is for a flux density of about 12,000 gauss and curve C is for a flux density of zero. Curve B shows that the resistivity is very nearly constant for wide variations in temperature, and in the usual operating range, between the vertical dotted lines, can be considered to be insensitive to temperature changes. Therefore, in order to make the circuits of Figures 1 to 4 free of temperature effects, the bias field supplied by the center leg 10a should be in the neighborhood of twelve kilogauss in the air gaps 11b and 11c.

Although the principle of the invention has been described in several embodiments, the invention is susceptible to many changes without departing from the spirit of the invention.

We claim:

1. A modulator and demodulator of electrical signals for electrical systems and comprising, terminals to which a pair of input signal voltages are applied, means for producing a pair of magnetic fields, means for varying the strength of said magnetic fields about a mean value according to one of said signal voltages and a pair of series connected resistors containing bismuth located in said magnetic fields and energized by the other of said signal voltages and a second pair of series connected resistors containing bismuth located in said magnetic fields and energized by a constant voltage and connections between one of said second pair of resistors and said one of said signal voltages to modify the signal voltage varying said magnetic fields.

2. A modulator and demodulator of electrical signals for electrical systems and comprising, terminals to which a pair of input signal voltages are applied, means for producing a pair of magnetic fields, means for varying the strength of said magnetic fields about a mean value according to one of said signal voltages and a pair of series connected resistors containing bismuth located in said magnetic fields and energized by the other of said signal voltages and output terminals connected to said resistors and a second pair of series connected resistors containing bismuth located in said magnetic field and energized by a constant voltage and connections between one of said second pair of resistors and said one of said first signal voltages to modify the signal voltage varying said magnetic fields.

3. A modulator and demodulator of electrical signals for electrical systems and comprising, terminals to which a pair of input signal voltages are applied, means for producing a magnetic field, means for varying the strength of said magnetic field about a mean value according to one of said signal voltages, first and second pairs of series connected resistors containing bismuth located in said magnetic field and said first pair of resistors being energized by the other of said signal voltages and said second pair of series connected resistors energized by a constant voltage, and feedback connections between one of said second pair of resistors and said one of said first signal voltages to modify the signal voltage varying said magnetic fields.

4. A modulator and demodulator of electrical signals for electrical systems and comprising a pair of terminals to which an input signal is applied, a pair of windings and magnetic means for producing a pair of magnetic fields, means for energizing said windings for oppositely varying the strength of said magnetic fields about a constant mean value other than zero according to said signal voltage, and a pair of series connected resistors containing bismuth located in said magnetic fields, a pair of resistors connected across said pair of bismuth resistors to form a bridge circuit, a constant voltage source connected across one diagonal of said bridge circuit and electrical connections between the other diagonal of said bridge circuit and said input signal for modifying the voltage of said terminals accordingly.

5. A modulator and demodulator of electrical signals for electrical systems and comprising, terminals to which a pair of input signal voltages are applied, means for producing a magnetic field, means for varying the strength of said magnetic field about a mean value, according to one of said signal voltages, a pair of series connected resistors containing bismuth located in said magnetic field, a pair of constant valued resistors connected across said pair of bismuth resistors to form a bridge circuit, said other of the input signal voltages connected across one diagonal of said bridge circuit, output terminals connected across the other diagonal of said bridge circuit, a second bridge circuit similar to the first and energized by a constant voltage and feedback connections between the output of said second bridge circuit and said one of said signal voltages to modify the signal varying said magnetic field.

References Cited in the file of this patent

UNITED STATES PATENTS

| | | |
|---|---|---|
| 1,596,558 | Sokoloff | Aug. 17, 1926 |
| 2,019,481 | Applegate | Nov. 5, 1935 |
| 2,063,125 | Rust | Dec. 8, 1936 |
| 2,075,380 | Varian | Mar. 30, 1937 |
| 2,571,915 | McCoubrey | Oct. 16, 1951 |
| 2,712,601 | Reinwald | July 5, 1955 |
| 2,727,211 | Dewitz | Dec. 13, 1955 |